US006996734B2

United States Patent
Fiebrich et al.

(10) Patent No.: US 6,996,734 B2
(45) Date of Patent: Feb. 7, 2006

(54) SYSTEM AND METHOD FOR USING A LEGACY BATTERY IN AN INFORMATION HANDLING SYSTEM USING A TABLE HAVING ACTUAL AND TRANSLATED REMAINING CAPACITY VALUES

(75) Inventors: Greg R. Fiebrich, Georgetown, TX (US); Adolfo S. Montero, Austin, TX (US); Mohammed Hijazi, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 631 days.

(21) Appl. No.: 10/153,087

(22) Filed: May 22, 2002

(65) Prior Publication Data

US 2003/0221132 A1   Nov. 27, 2003

(51) Int. Cl.
*G06F 1/26*   (2006.01)
(52) U.S. Cl. .............. 713/340; 713/300; 320/106; 320/107; 320/132; 320/135; 320/136; 324/426; 324/427; 324/428
(58) Field of Classification Search ............... 713/300, 713/340; 320/106, 107, 132; 324/429, 432, 324/433
See application file for complete search history.

(56) References Cited

U.S. PATENT DOCUMENTS

| 5,519,261 | A | | 5/1996 | Stewart ...................... 307/87 |
|---|---|---|---|---|
| 5,523,671 | A | | 6/1996 | Stewart ..................... 320/152 |
| 5,545,935 | A | | 8/1996 | Stewart ..................... 307/150 |
| 5,565,759 | A | * | 10/1996 | Dunstan ..................... 320/135 |
| 5,604,708 | A | | 2/1997 | Helms et al. ............... 365/229 |
| 5,608,324 | A | * | 3/1997 | Yoshida ..................... 320/106 |
| 5,627,453 | A | | 5/1997 | Sheehan et al. ............ 320/134 |
| 5,955,867 | A | * | 9/1999 | Cummings et al. ......... 320/107 |
| 6,483,274 | B2 | * | 11/2002 | Lee ............................ 320/132 |
| 6,522,361 | B2 | * | 2/2003 | Higuchi et al. ............. 320/106 |
| 6,538,449 | B2 | * | 3/2003 | Juncker et al. ............. 324/429 |

* cited by examiner

*Primary Examiner*—A. Elamin
*Assistant Examiner*—James K. Trujillo
(74) *Attorney, Agent, or Firm*—Haynes and Boone, LLP

(57) ABSTRACT

An information handling system that includes a processor, a memory, a program, a battery, and a module. The module receives a request for first information associated with the battery from the program, accesses the first information, converts the first information into second information, and provides the second information to the program in response to the request.

16 Claims, 2 Drawing Sheets

SYSTEM AND METHOD FOR USING A LEGACY BATTERY IN AN INFORMATION HANDLING SYSTEM USING A TABLE HAVING ACTUAL AND TRANSLATED REMAINING CAPACITY VALUES

BACKGROUND

The disclosures herein relate generally to information handling systems and more particularly to a system, method, and computer program product for using a legacy battery in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems, particularly portable information handling systems, often use one or more batteries to provide power to the system. These batteries typically specify a maximum discharge rating. The maximum discharge rating indicates a maximum amount of current, often expressed in amperes, that the system may draw. The use of a battery in excess of its maximum discharge rating over a period of time may cause the battery to fail or may cause other system problems.

As the architectures of information handling systems continue to evolve, additional current may be consumed by these systems. This use of additional current may cause the system to exceed the maximum discharge rating of a battery, particularly where the battery used in the system was designed for a previous system architecture that consumed less power. These batteries, referred to as legacy batteries, may provide cost savings that make their continued use in newer systems desirable.

It would be desirable to be able to use legacy batteries in newer information handling systems even where the newer systems consume more power than previous systems. Accordingly, what is needed is a system, method, and computer program product for using a legacy battery in an information handling system.

SUMMARY

One embodiment, accordingly, provides an information handling system that includes a processor, a memory, a program, a battery, and a module. The module receives a request for first information associated with the battery from the program, accesses the first information, converts the first information into second information, and provides the second information to the program in response to the request.

A principal advantage of this embodiment is that various shortcomings of previous techniques are overcome. For example, legacy batteries may be used in systems that consume more power than systems for which the legacy batteries were originally designed.

DETAILED DESCRIPTION

Figure 1:
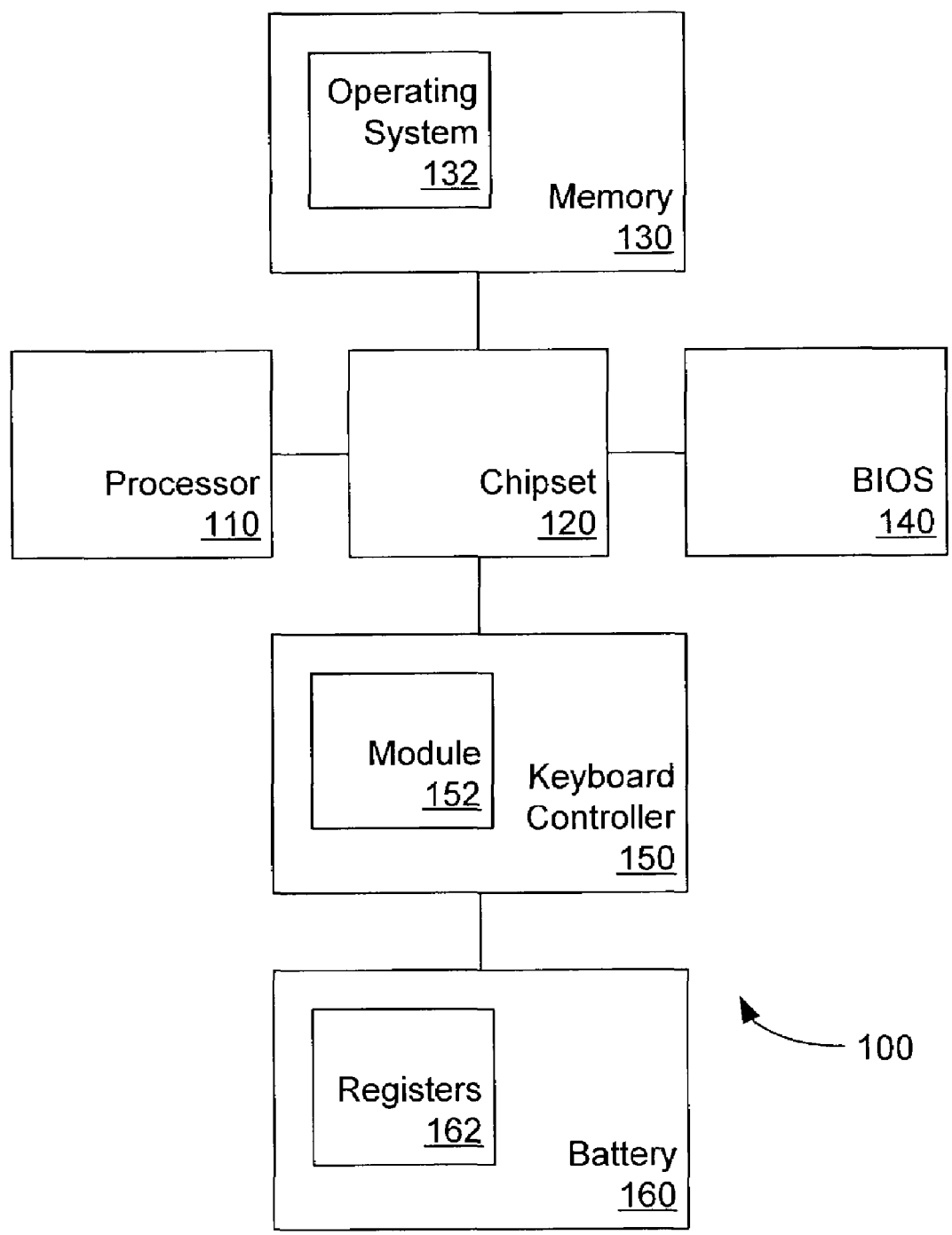
FIG. 1 is a diagram illustrating an embodiment of selected portions of an information handling system for improving battery usage in the system.

FIG. 1 is a diagram illustrating an embodiment of selected portions of an information handling system 100. Information handling system 100 is an instrumentality or aggregate of instrumentalities primarily designed to compute, classify, process, transmit, receive, retrieve, originate, switch, store, display, manifest, detect, record, reproduce, handle, or utilize any form of information, intelligence or data for business, scientific, control or other purposes. System 100 includes a processor 110, a chipset 120, a memory 130, a basic input output system (BIOS) 140, a keyboard controller 150, and a battery 160. Chipset 120 is coupled to processor 110, memory 130, BIOS 140, and keyboard controller 150. Keyboard controller 150 is coupled to battery 160. Memory 130 includes an operating system 132 keyboard controller 150 includes a module 152, and battery 160 includes registers 162.

System 100 operates by executing BIOS 140 or a system firmware (not shown) in response to being powered up or reset. BIOS 140 identifies and initializes the components of system 100 and causes operating system 132 to be booted. Operating system 132 provides a user of system 100 with an ability to initiate and run one or more applications (not shown) on system 100. The applications may be stored on a storage device of system 100 or on a remote device configured to communicate with system 100. System 100 may be configured to communicate with other devices or information handling systems.

In the embodiment shown in FIG. 1, system 100 is a portable information handling system such as a notebook, a laptop, or other computer system configured to operate using battery 160. In at least one mode of operation, battery 160 provides power to system 100. In other modes of operation, system 100 may be powered by other sources of power.

In the embodiment of FIG. 1, operating system 132 is configured to manage the power consumption of system 100. To do so, operating system 132 accesses information associated with battery 160 to determine information such as voltage, current, and remaining capacity of battery 160. In particular, operating system 132 periodically monitors the amount of power capacity remaining in battery 160 to ensure that system 100 has the ability to save its state and shutdown before the power of battery 160 runs out. For example, operating system 132 may cause a user of system 100 to be prompted to save his or her work and shutdown system 100 when the capacity of battery 160 reaches a lower threshold. Alternatively, operating system 132 may automatically commence a shutdown of system 100 in response to detecting a capacity of battery 160 below a certain threshold. In other embodiments, a program other than operating system 132 may perform the above shutdown functions and may interact with module 152 in the manner attributed to operating system 132 in the description below.

It is desirable for system 100 to avoid exceeding a maximum discharge rating of battery 160. For example, a sample table is shown below where system 100 consumes a constant power draw of 53 Watts and the maximum discharge rating of battery 160 is 4 Amperes.

TABLE 1

| REMAINING CAPACITY | VOLTAGE | CURRENT |
|---|---|---|
| 100% | 17 Volts | 3.12 Amps |
| 80% | 16 Volts | 3.31 Amps |
| 60% | 15 Volts | 3.53 Amps |
| 40% | 14 Volts | 3.79 Amps |
| 20% | 13 Volts | 4.08 Amps |
| 0% | 12 Volts | 4.42 Amps |

As shown in Table 1, system 100 causes battery 160 to exceed the 4 Ampere maximum discharge rating as battery 160 discharges past the 20% remaining capacity threshold.

Module 152 prevents system 100 from exceeding the maximum discharge rating of battery 160. Module 152 does so by converting capacity information or other battery information reported by battery 160 into values that cause operating system 132 to shut down system 100 prior to system 100 exceeding the maximum discharge rating of battery 160.

Figure 2:
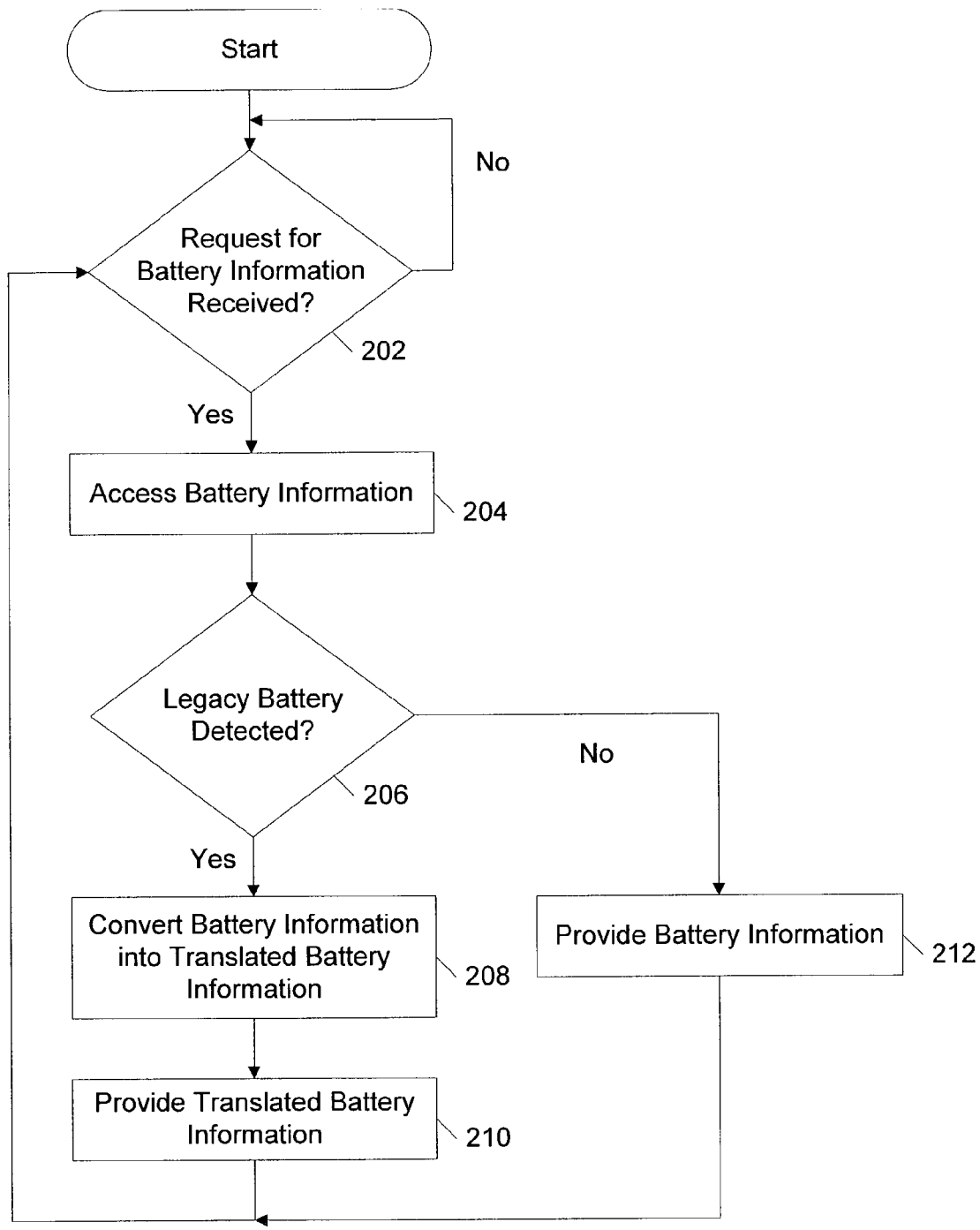
FIG. 2 is a flow chart illustrating an embodiment of a method for improving battery usage in an information handling system.

FIG. 2 illustrates a method performed by module 152 to prevent system 100 from exceeding the maximum discharge rating of battery 160. Referring simultaneously to FIGS. 1 and 2, module 152 determines whether a request for battery information is received as indicated in step 202. Module 152 remains in the state illustrated by step 202 until a request for battery information is received. In response to a request for battery information being received, module 152 causes battery information to be accessed. In the embodiment shown in FIG. 1, battery 160 includes registers 162 for storing information associated with battery 160. This information includes voltage, current, and remaining capacity of battery 160. Module 152 access this information from registers 162. In other embodiments, information associated with battery 160 may be stored in other locations in battery 160 or system 100 or may be accessed by module 152 in other ways.

Module 152 determines whether battery 160 is a legacy battery as indicated in step 206. A legacy battery refers to any battery where the power requirements of system 100 may cause system 100 to exceed the maximum discharge rating of the battery. Module 152 determines whether battery 160 is a legacy battery by determining a type of battery 160. In one embodiment, module 152 may include a list of batteries that are legacy batteries for system 100. In this embodiment, module 152 determines whether battery 160 is a legacy battery by locating battery 160 in the list. In other embodiments, an indicator of the type of battery 160 may be programmed into module 152 or stored in a location accessible to module 152 such that the indicator is used to determine whether battery 160 is a legacy battery.

In response to module 152 determining that battery 152 is not a legacy battery in step 206, module 152 provides the battery information to operating system 132 as indicated in step 212. For example, if module 152 determines that battery 160 is not a legacy battery and that the remaining capacity of battery 160 is 20%, then module 152 would report the that remaining capacity of battery 160 as 20% to operating system 132. Module 152 may also provide other battery information such as voltage and current information to operating system 132. Module 152 would then return to the state of step 202 as shown.

In response to module 152 determining that battery 152 is a legacy battery in step 206, module 152 converts the battery information into translated battery information as indicated in step 208. An example of such as conversion may be seen in Table 2.

TABLE 2

| ACTUAL REMAINING CAPACITY | VOLTAGE | CURRENT | TRANSLATED REMAINING CAPACITY |
|---|---|---|---|
| 100% | 17 Volts | 3.12 Amps | 100% |
| 80% | 16 Volts | 3.31 Amps | 75% |
| 60% | 15 Volts | 3.53 Amps | 50% |
| 40% | 14 Volts | 3.79 Amps | 25% |
| 20% | 13 Volts | 4.08 Amps | 0% |
| 0% | 12 Volts | 4.42 Amps | 0% |

As shown in the example of Table 2, module 152 converts each actual remaining capacity value of battery 160 into a translated remaining capacity value. Thus, if module 152 detects the actual remaining capacity to be 80%, it converts the 80% value into a translated remaining capacity value of 75%. Likewise, an actual remaining capacity value of 40% becomes a translated remaining capacity value of 25%, and an actual remaining capacity value of 20% becomes a translated remaining capacity value of 0%.

Subsequent to converting the battery information, module 152 provides the translated battery information, i.e. the translated remaining capacity in the above example, to operating system 132 as indicated in step 210. Module 152 may also provide other battery information to operating system 132. Module 152 would then return to the state of step 202 as shown.

By translating the battery information as illustrated above, module 152 can cause operating system 132 to shut down system 100 before system 100 exceeds the maximum discharge rating of battery 160. In the example above, module 152 indicates to operating system 132 that the remaining capacity of battery 160 is 0% even though battery 160 has additional power capacity available. As a result, operating system 132 will cause system 100 to shut down before the current drawn from battery 160 exceeds the maximum discharge rating of 4 Amperes.

In one embodiment, module 152 uses a table (not shown), such as the table shown in Table 2 above, stored in module 152 to translate the actual remaining capacity into translated remaining capacity as shown in the example above. The table includes a plurality of actual remaining capacity values and an associated plurality of translated remaining capacity values. The module converts the battery information into translated battery information using the plurality of actual remaining capacity values and the plurality of translated remaining capacity values in the table.

In other embodiments, module 152 includes an algorithm or other information that may be used to translate battery information to cause operating system 132 to shutdown system 100 before the maximum discharge rating is exceeded.

In other embodiments, module 152 may convert voltage and/or current information into translated voltage and/or current information and provide the translated voltage and/or current information to operating system 132. In other words, the translated voltage and/or current information may be used in place of the translated remaining capacity information to cause operating system 132 to shutdown prior to system 100 exceeding the maximum discharge rating.

In certain embodiments, steps 206 and 212 may be omitted such that module 152 performs step 208 subsequent to step 204.

In the embodiment shown in FIG. 1, module 152 comprises software code and other information that is contained in keyboard controller 150 and processable by keyboard controller 150. In other embodiments, module 152 may comprise digital or analog circuitry or a combination of software and circuitry. In addition, module 152 may be located in other places within system 100 such as in BIOS 140, a device driver (not shown), or another controller or device within system 100.

For purposes of these embodiments, an information handling system may include any instrumentality or aggregate of instrumentalities primarily designed to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

As can be seen, the principal advantages of these embodiments are that various shortcomings of previous techniques are overcome. For example, legacy batteries may be used in systems that consume more power than systems for which the legacy batteries were originally designed.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An information handling system comprising:
 a processor;
 a memory coupled to the processor;
 a program stored in the memory and executable by the processor;
 a battery configured to provide power to the processor and the memory; and
 a module having a table including a plurality of actual remaining capacity values and an associated plurality of translated remaining capacity values for:
  receiving a request for first information associated with the battery from the program;
  accessing the first information;
  converting the first information into second information using the plurality of actual remaining capacity values and the plurality of translated remaining capacity values from the table; and
  providing the second information to the program in response to the request.

2. The information handling system of claim 1, further comprising:
 a keyboard controller that includes the module.

3. The information handling system of claim 1, further comprising:
 a basic input output system (BIOS) that includes the module.

4. The information handling system of claim 1, wherein the first information indicates an actual remaining capacity of the battery.

5. The information handling system of claim 4, wherein the second information indicates a translated remaining capacity of the battery that is less than the actual remaining capacity of the battery.

6. The information handling system of claim 1, wherein the first information includes voltage information associated with the battery.

7. The information handling system of claim 1, wherein the first information includes current information associated with the battery.

8. The information handling system of claim 1, wherein the program comprises an operating system.

9. The information handling system of claim 1, wherein the module is for:
 detecting a type of the battery; and
 providing one of the first and second information to the program corresponding to the type of battery detected.

10. A method performed within a computer system that includes a program and a battery comprising:
 receiving a request for first information associated with the battery from the program;
 accessing the first information;
 converting the first information into second information using a plurality of actual remaining capacity values and a plurality of translated remaining capacity values from a table; and
 providing the second information to the program in response to the request.

11. The method of claim 10, wherein the first information indicates an actual remaining capacity of the battery.

12. The method of claim 11, wherein the second information indicates a translated remaining capacity of the battery that is less than the actual remaining capacity of the battery.

13. The method of claim 10, wherein the first information includes voltage information associated with the battery.

14. The method of claim 10, wherein the first information includes current information associated with the battery.

15. The method of claim 10, further comprising:
 detecting a type of the battery; and
 providing one of the first and second information to the program in response to the type of battery detected.

16. An information handling system comprising:
 a program;
 a battery; and
 a module for:
  receiving a request for first information associated with the battery from the program;

accessing the first information;
converting the first information into second information using a plurality of actual remaining capacity values and a plurality of translated remaining capacity values from a table; and providing the second information to the program in response to the request.

* * * * *